Aug. 5, 1958
J. S. PILCH
2,846,094
TRACTOR OPERATED TRENCHER
Filed June 22, 1954
5 Sheets-Sheet 1
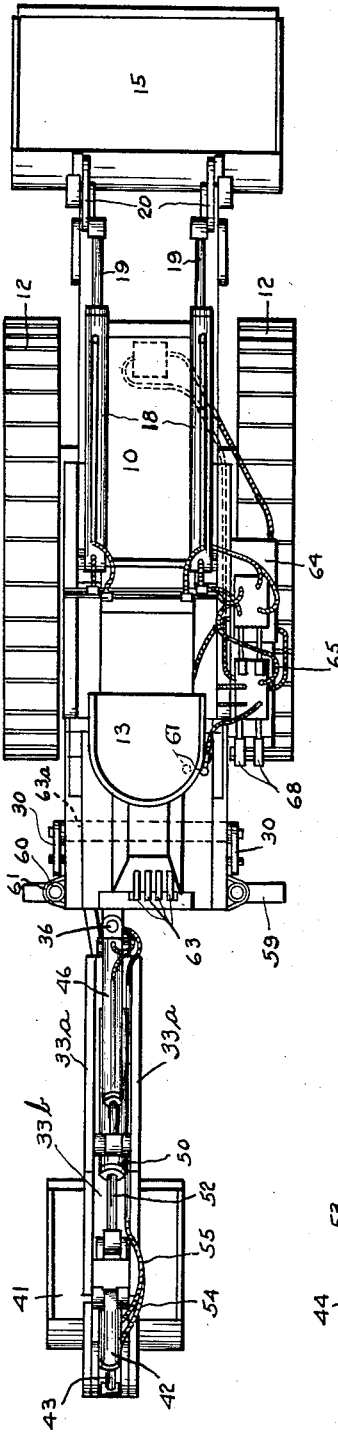
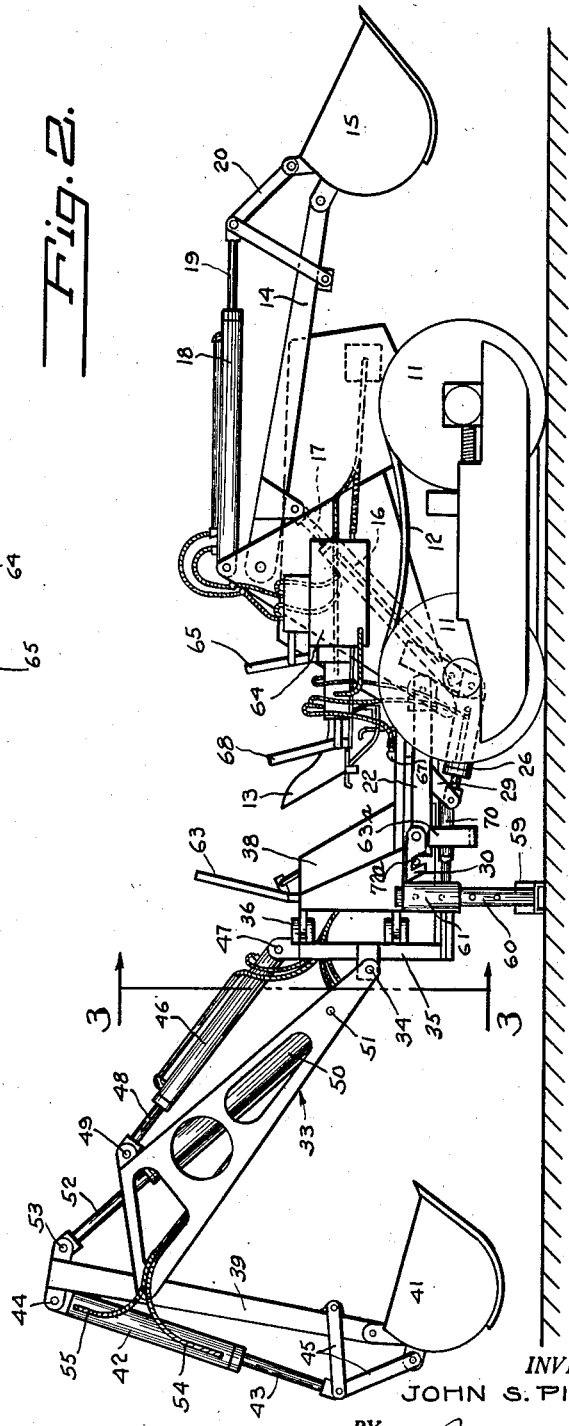
INVENTOR.
JOHN S. PILCH
BY
Raymond A. Paquin
ATTORNEY.

Aug. 5, 1958 J. S. PILCH 2,846,094
TRACTOR OPERATED TRENCHER
Filed June 22, 1954 5 Sheets-Sheet 2
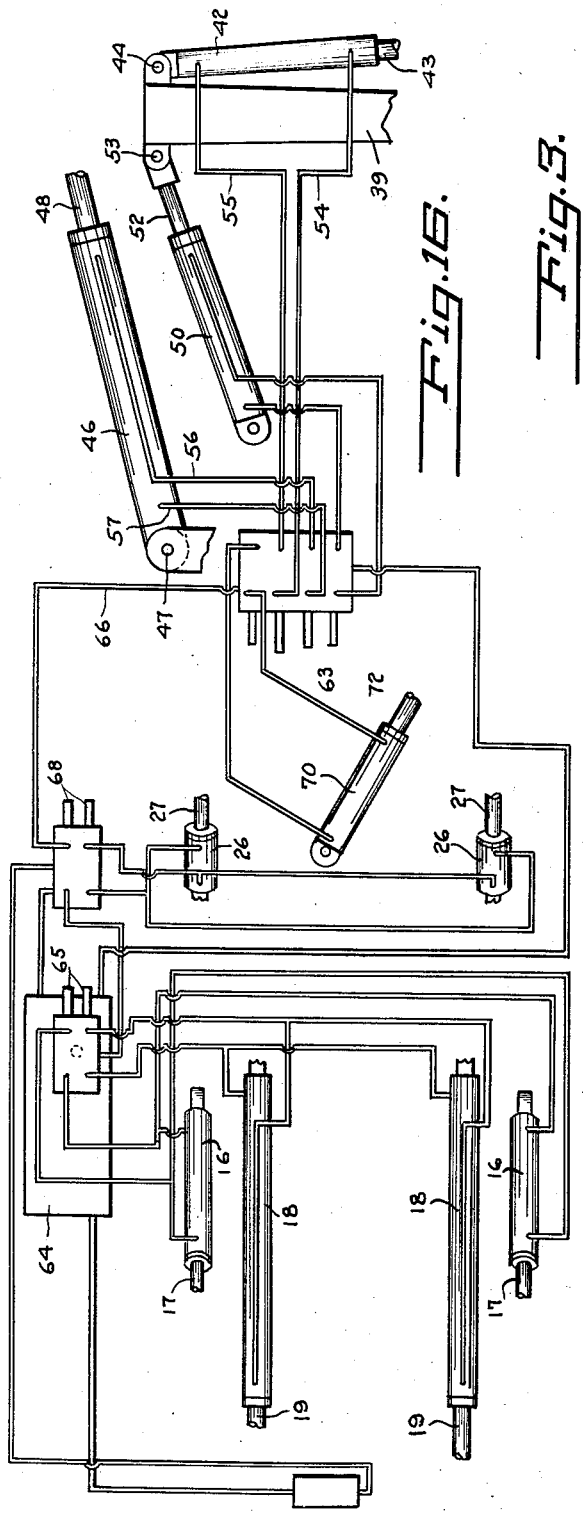
INVENTOR.
JOHN S. PILCH
BY
Raymond A. Paquin
ATTORNEY.

Aug. 5, 1958  J. S. PILCH  2,846,094
TRACTOR OPERATED TRENCHER
Filed June 22, 1954  5 Sheets-Sheet 3
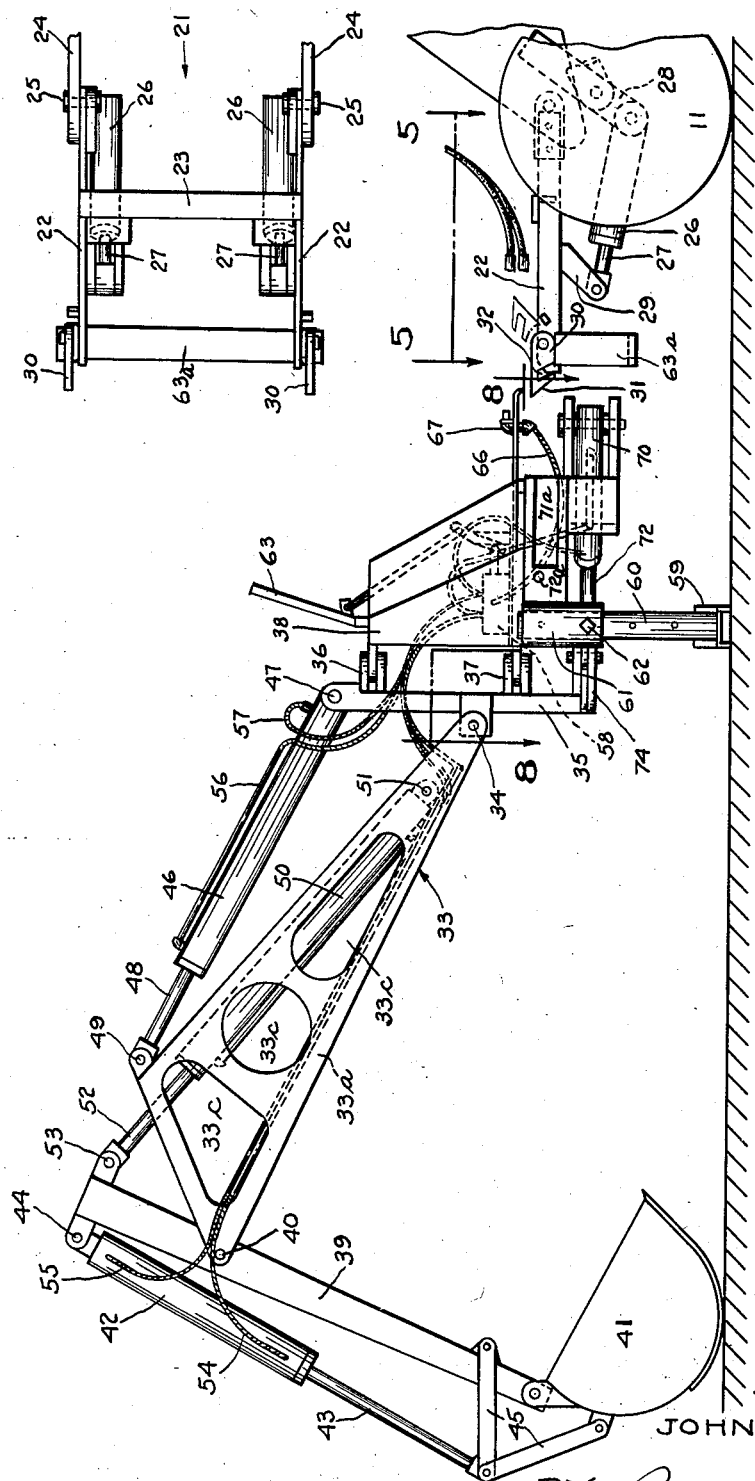
INVENTOR.
JOHN S. PILCH
BY
ATTORNEY.

Aug. 5, 1958   J. S. PILCH   2,846,094
TRACTOR OPERATED TRENCHER
Filed June 22, 1954   5 Sheets-Sheet 4
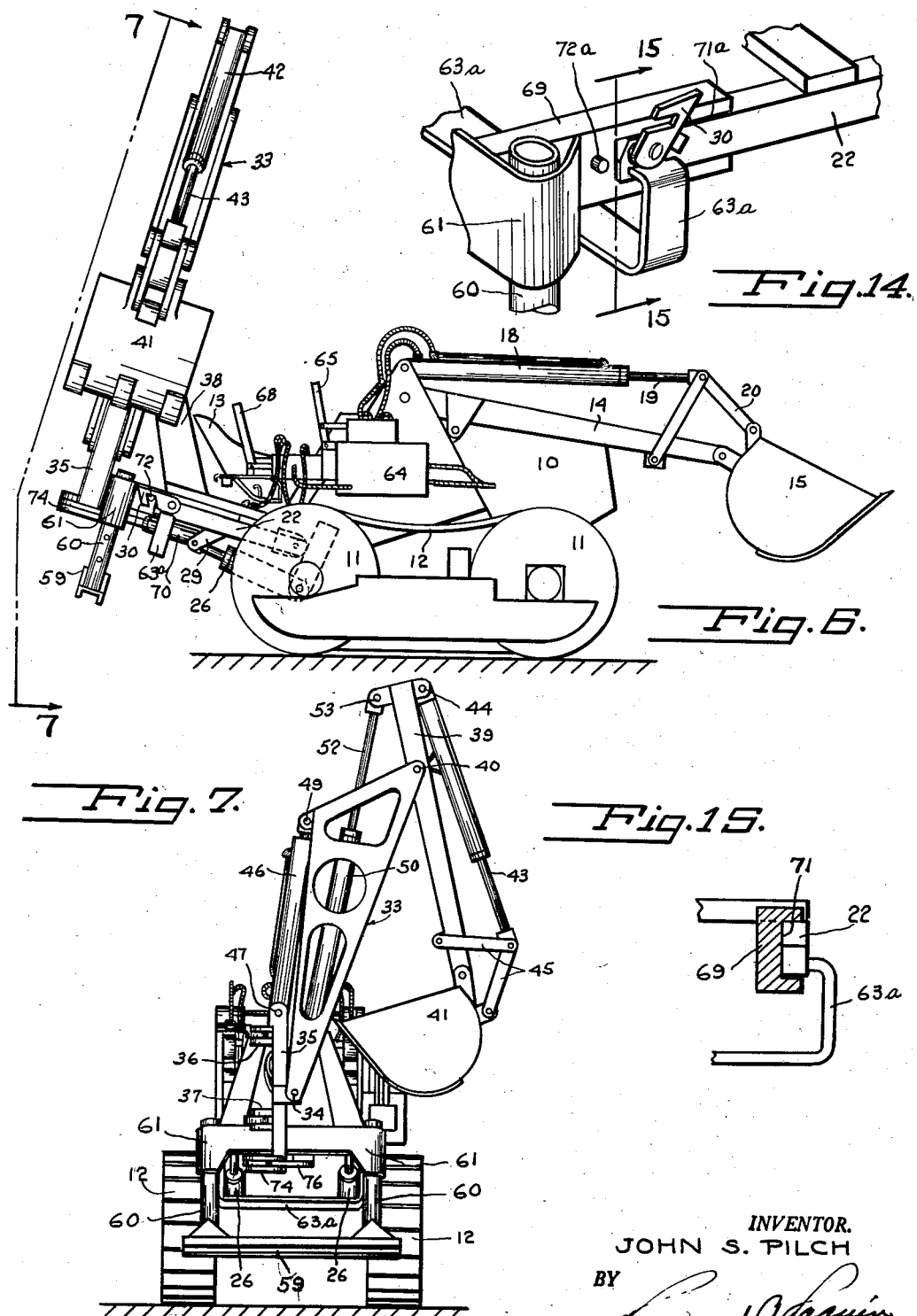
INVENTOR.
JOHN S. PILCH
BY
Raymond A. Jaquin
ATTORNEY.

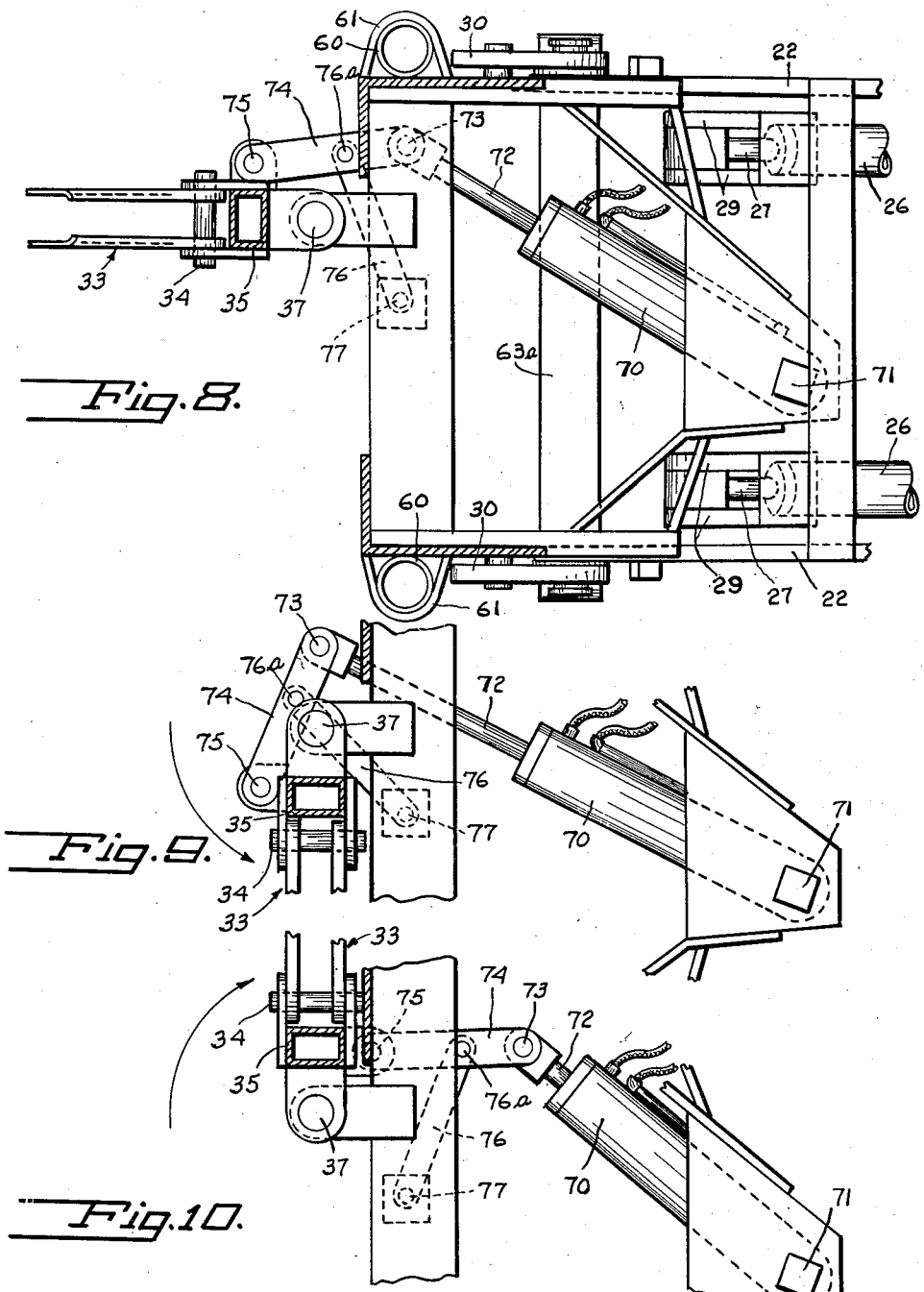

United States Patent Office 2,846,094
Patented Aug. 5, 1958

2,846,094
TRACTOR OPERATED TRENCHER
John S. Pilch, Ware, Mass.
Application June 22, 1954, Serial No. 438,413
2 Claims. (Cl. 214—131)

This invention relates to a new and improved back hoe or trencher and has particular reference to such a device which is adapted to be tractor mounted and carried and which utilizes the tractor as a power source.

An object of the invention is to provide a new and improved apparatus of the type set forth which may be easily and quickly attached to and detached from the tractor thereby allowing the use of the tractor with other implements and apparatus.

Another object of the invention is to provide a new and improved apparatus of the type set forth which may be easily and quickly attached to and detached from a tractor and which is a completely self-contained unit.

Another object is to provide a tractor mounted apparatus which is adapted to be attached to or detached from a tractor and wherein the controls for the unit are integral therewith and are adapted to be connected to the tractor power source.

Another object is to provide an apparatus of the type set forth which is relatively simple and inexpensive in construction and yet efficient in operation.

Another object is to provide a new and improved quickly detachable hitch arrangement for tractors for easy and quick attachment to and detachment from various implements and apparatus.

Another object is to provide a new and improved trenching apparatus adapted to be connected and disconnected as a unit from a tractor without interfering with the loading apparatus carried by the tractor.

Another object is to provide a new and improved outrigger construction for an apparatus of the type set forth which is adapted to support the unit when the unit is sitting on the ground and which can also be used to level ground or as a pusher.

Another object is to provide a new and improved boom swinging arrangement for an apparatus of the type set forth which provides a wide range of pivotal motion of the boom and assures constant speed of travel throughout the entire swing and which is relatively simple, inexpensive and compact.

Another object is to provide a new and improved operator's seat arrangement for apparatus of the type set forth which allows the same seat to be used for both directions and which may be easily and quickly adjusted for use in either direction.

Another object is to provide an apparatus of the type set forth which allows working practically parallel with and alongside a wall and embankment.

Another object is to provide an apparatus of the type set forth which allows the apparatus to be positioned substantially closer to the center of gravity of the vehicle when travelling.

Another object is to provide a new and improved simplified hosing pattern for a device of the type set forth which requires less fittings and shorter hoses and which requires only small loops and does not create excessive bends in the hoses regardless of the angle to which the apparatus is turned.

Another object is to provide a new and improved boom construction for an apparatus of the type set forth which is relatively rugged and protected on all sides yet relatively light weight and inexpensive and which, totalled, includes the dipper stick, cylinder and hoses.

Another object is to provide an apparatus of the type set forth having a separate control system and a control valve on the tractor to direct oil to either system on the tractor or the apparatus.

Another object is to provide a new and improved quickly detached hitch construction for connecting implements to a tractor.

Other objects and advantages of the invention will be apparent from the following description taken in connection with the accompanying drawings. It will be understood that changes may be made in the details of construction and arrangement of parts without departing from the spirit of the invention as set forth in the accompanying claims as the preferred form has been given by way of illustration only.

Referring to the drawings:

Fig. 1 is a side view of an apparatus embodying the invention;

Fig. 2 is a top or plan view of the apparatus shown in Fig. 1;

Fig. 3 is a sectional view taken on line 3—3 of Fig. 1, looking in the direction of the arrows;

Fig. 4 is a fragmentary side view, similar to Fig. 1, but showing the trencher detached from the tractor;

Fig. 5 is a view on line 5—5 of Fig. 4, looking in the direction of the arrows;

Fig. 6 is a side view generally similar to Fig. 1, but showing the apparatus in position for trenching;

Fig. 7 is a view taken on line 7—7 of Fig. 6, looking in the direction of the arrows;

Figs. 8, 9 and 10 are top or plan views of the boom pivoting mechanism;

Figs. 11, 12 and 13 are side views of the seat arrangement;

Fig. 14 is a fragmentary perspective view of the detachable hitch arrangement;

Fig. 15 is a sectional view taken on line 15—15 of Fig. 14, looking in the direction of the arrows; and Fig. 16 is a diagrammatic view of the hydraulic system of the apparatus;

Referring more particularly to the drawings wherein similar reference characters designate corresponding parts throughout the several views, the arrangement shown embodying the invention comprises a tractor having an engine 10, wheels 11, track 12 and operator's seat 13.

On the tractor is mounted a loader including the loader or push arms 14, bucket 15 and the loader raising and lowering cylinder and ram 16 and 17, respectively. The bucket pivoting mechanism comprises the cylinder 18, ram 19 and link 20.

The loader is shown in usual position on the tractor and it will be seen that the trencher can be attached to and detached from the tractor without interfering with the loader mounted thereon.

For easy and quick connection and disconnection of the trencher and other implements to the tractor, the tractor is provided with a platform designated generally at 21 and which comprises the side members 22 connected by the cross pieces 23 and 63a. The side pieces 22 are pivotally mounted to the tractor frame 24 at 25.

Instead of the cross pieces 23, a full platform may be provided between the side pieces 22 thus totalling the platform.

The cylinders 26 and rams 27 are provided for pivoting the platform relative to the tractor and the cylinders 26 are connected to supports 28 depending from the tractor frame 24 and the rams 27 are connected to supports 29 depending from the platform.

The platform is provided with a pair of pivotal dogs 30 adjacent its rear end for connection to the platform of the implement or apparatus to be attached to the tractor and these pivotal dogs have their rear edges 31 tapered in such a direction that they engage with a pin to automatically open or lift the dogs and they will then automatically close with the pin in the slots 32 to connect the apparatus or implement to the platform and tractor. The slots 32 each have their forward surfaces 33 also tapered in the same direction of the surfaces 31 so that backing of the tractor towards the implement or apparatus will lift or pivot the dogs to facilitate the quick and easy detaching of the implement or apparatus from the tractor.

The trenching apparatus shown comprises the boom 33 pivotally mounted at 34 on the support 35 for vertical pivotable movement and the support 35 is pivotally connected by the pivots 36 and 37 to the support 38 for swinging movement relative thereto.

The dipper stick 39 is pivotally connected at 40 to the outer or free end of boom 33 and dipper stick 39 carries trencher bucket 41 which is adapted to be pivoted relative to dipper stick 39 by means of cylinder 42 and ram 43. Cylinder 42 is pivotally connected at 44 to the dipper stick and ram 43 is connected through linkage 45 to bucket 41 for effecting rotation thereof.

The boom is adapted to be raised and lowered, that is, moved in a vertical direction by means of boom cylinder 46 which is pivotally connected at 47 to the upper end of support 35 and ram 48 which is pivotally connected at 49 to boom 33.

Dipper stick 39 is pivoted relative to boom 33 by means of dipper stick cylinder 50 which is pivotally connected at 51 to boom 33 and ram 52 which is pivotally connected at 53 to the dipper stick 39.

Boom 33 comprises the side members 33a connected by a lower plate or connecting member 33b. The boom may be formed from a single piece of material or three separate pieces secured together and the cutout 33c may be provided of desired contour to lighten the structure and yet provide adequate protection for the dipper stick cylinder 50 and ram 52 as well as the hoses 54 and 55, bucket actuating cylinder 42 and the hoses for dipper stick cylinder 50. It will be seen that if the dipper stick cylinder 50 and ram 52 as well as the hoses 54 and 55 are totally enclosed by the boom, that they cannot be damaged by coming into contact with exterior objects during use.

It will be noted that the hoses 54 and 55 for bucket actuating cylinder 42 as well as the hoses for dipper stick actuating cylinder 50 and the hoses 56 and 57 for boom actuating cylinder 46 all extend through an opening in support 35 from which they pass to control valve 58 and this arrangement provides a simplified hose pattern with less fittings and shorter hoses and as all of the hoses go through the opening in the center of support or turret 35, which opening is left for this purpose, they require only small loops in the hoses and do not create excessive bends in the hoses regardless of the angle to which the apparatus is turned.

As pointed out above, with the cylinder and hose inside of the boom, protection is thereby provided on all sides of the boom which is light weight, yet rugged, and affords good protection for the cylinder and hoses, as previously described.

Beneath the support 38 and connected thereto is the trencher outrigger structure comprising the ground engaging support 59 connected to the uprights 60 which are in telescoping relation with the supports 61 to which they are adjustably connected by means of the pins 62 which may be positioned in any of the various holes shown whereby the outrigger may be locked in vertically adjusted position relative to the support 38.

It will be noted that the outrigger arrangement can be detached from the apparatus or adjusted, as stated, thus providing a wider range of loading or digging and when sitting on the ground will provide a three point support with the bucket for the trencher apparatus when not in use and also that by moving the tractor, the outrigger can be used to level the ground or to push material out of the way, such as pushing a boulder into a ditch.

As will be seen from the drawings, the trencher apparatus is provided with its own hydraulic control valve 58 and operating levers 63 and the tractor has its control valve system 64 and operating levers 65 and the only connection between the hydraulic system of the trencher with the hydraulic system of the tractor that is required are the two hoses 66 with quickly detachable couplings 67. The control valve 68 is provided on the tractor to divert fluid to either the hydraulic system on the tractor or the hydraulic system on the apparatus, as desired.

It will thus be seen that the trencher unit is complete in itself and need only be connected to the tractor by the quickly detachable hitch and the two hoses which allows easy and quick attachment of the unit to the tractor or detachment therefrom.

The trencher unit is provided with the platform having the side pieces 69 having the grooves or slots 71a adapted to receive the side pieces 22 on the tractor platform 21 and also has the pins 72a for locking relation with the dog 30 as previously described.

It will be seen that the connection of the two platforms on the tractor and trencher, which may be enclosed platforms or open platforms, as shown, is of the tongue and groove type hitch with only two hooks required for connecting the parts and that only this quickly detachable connection between the two platforms and the hoses 66 to the hydraulic lines of the tractor are required for connection of the units. The tongue and groove arrangement shown provides a construction whereby both platforms can be tied in with reinforcing structure and can be, in effect, a single member. The open type of platform shown allows tying across to the other members and thus, in effect, making a full platform, as stated above.

It will be noted that the turret or upright support 35 for boom 33 is set in off-center position with relation to support 38 which arrangement allows the operator to sit in the center of the tractor and still have good vision while trenching without turning or cramping his neck in order to watch the working of the apparatus and also allows working or digging practically parallel with and alongside of a wall or embankment.

Further, when the apparatus is used for loading, it provides better reach beyond the tractor because of being offset to one side and when unloading dirt from the trencher to the opposite side of the tractor, it provides better balance with less need of support or counterweight. Furthermore, in transport, it allows the bucket to be swung over to one side as shown in Figs. 6 and 7 without any substantial portion of the bucket extending beyond the side of the tractor and by tilting the bucket further up for transport purpose, it brings the weight of the trencher closer to the center of gravity of the vehicle or tractor. By pivoting the platform downwardly, the trencher is moved away from the operator thus allowing ample space for the operator during the trenching.

It is pointed out that when the trencher unit is not connected to the platform 21 that this platform, when the apparatus is being used for loading or the like, can carry counterweight or scarifiers or scrapers or the like.

The apparatus which pivots the turret or support 35 which carries the boom 33 relative to support 38 and about pivots 36 and 37 comprises cylinder 70 which is pivotally connected at 71 to platform 21 and ram 72 which is pivotally connected at 73 to link 74 which is pivotally connected at 75 to turret or support 35.

The link 76 is provided between link 74 and platform 21 and is pivotally connected at its opposite ends 76 and 77 respectively to link 74 and platform 21.

By this arrangement, it is possible with a single cylinder and ram to swing the turret 35 and boom in the arch of at least 180° and by the use of positioning, link 76 practically assures substantially constant true speed of travel throughout the entire range of travel and also allows greater range of swing.

It will also be seen that this arrangement utilizes but a single piston and cylinder thus providing a more compact and inexpensive unit.

The same operator's seat 13 is utilized for both operating the tractor and the trencher and the seat is pivotally connected at 77 to a link 78 which is pivotally connected at 79 to seat support 80 whereupon it is only necessary to lift the seat and turn and drop the seat into place whereupon the depending brackets 81 on each side of support 80 retain the seat in adjusted position due to the weight of the operator and without requiring lugs or other holding means.

This construction allows the operator to quickly pivot the seat for moving the tractor forward without leaving the seat as well as using the same seat for operating the trencher and tractor both. By leaning forward and without leaving the seat, the operator can pivot the seat and swing the seat around in either direction and then by straightening out, the seat will automatically lock in desired position.

Because of the shape of hooks 30, the harder the pull by the tractor the tighter the connection between hooks 30 and pins 72a will be.

From the foregoing, it will be seen that I have provided new and improved means for obtaining all of the objects and advantages of the invention.

I claim:

1. In combination a tractor, a quick connection coupling mounted on said tractor by a horizontal pivot normal to the direction of travel of the tractor for pivotal movement, hydraulic cylinder and piston means to swing said coupling means on said pivot, a back hoe attachment for said tractor comprising a platform, a vertical support on said platform, a boom, a dipper stick and a bucket, forming back hoe means pivotally mounted on said vertical support, a vertically adjustable outrigger device having extensible depending legs on said platform to steady the attachment when in use and, with said bucket lowered to form a bracing support to support the platform when not attached to said tractor, sad platform carrying quick coupling means for engagement with said coupling means on said tractor, whereby said tractor and said attachment may be readily assembled for use as an integral unit or disassembled for use of said tractor alone.

2. In combination a tractor, a quick connection coupling means mounted for pivotal movement on said tractor by a horizontal pivot normal to the direction of travel of the tractor, hydraulic cylinder and piston means to swing said coupling means on said pivot, an attachment comprising a platform, a boom, an implement for attachment to said boom, said boom being mounted on and supported by said platform, means for raising and lowering said boom with respect to said platform operatively engaging said platform and said boom, a vertically adjustable outrigger device having extensible depending legs mounted on said platform to steady the attachment when said implement is in use and, with said implement in ground contacting position to form a bracing support, to support the platform when the attachment is not attached to said tractor, said platform carrying quick coupling means complementary to, and engageable by, said coupling means on said tractor whereby said attachment may be readily assembled with said tractor as an integral unit.

References Cited in the file of this patent

UNITED STATES PATENTS

| Number | Name | Date |
|---|---|---|
| D. 180,494 | Pilch | June 18, 1957 |
| 1,005,065 | Parrish | Oct. 3, 1911 |
| 2,109,388 | Heller | Feb. 22, 1938 |
| 2,411,498 | Billings | Nov. 26, 1946 |
| 2,418,299 | Gorsuch | Apr. 1, 1947 |
| 2,483,565 | Strandlund | Oct. 4, 1949 |
| 2,595,864 | Lowry | May 6, 1952 |
| 2,620,715 | Silver et al. | Dec. 9, 1952 |
| 2,660,816 | Maxwell | Dec. 1, 1953 |
| 2,669,367 | Wills et al. | Feb. 16, 1954 |
| 2,672,915 | Jones | Mar. 23, 1954 |
| 2,702,137 | Ives | Feb. 15, 1955 |
| 2,718,312 | Pilch | Sept. 20, 1955 |